(12) United States Patent
Kim

(10) Patent No.: US 7,765,330 B2
(45) Date of Patent: *Jul. 27, 2010

(54) APPARATUS FOR PLAYING MEDIA AND METHOD OF SETTING RESOURCES THEREOF

(75) Inventor: Ik Ju Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 380 days.

This patent is subject to a terminal disclaimer.

(21) Appl. No.: 11/705,542

(22) Filed: Feb. 13, 2007

(65) Prior Publication Data

US 2007/0192471 A1  Aug. 16, 2007

(30) Foreign Application Priority Data

Feb. 13, 2006  (KR) .................. 10-2006-0013642

(51) Int. Cl.
*G06F 15/16* (2006.01)
*H04J 3/00* (2006.01)
*H04N 5/00* (2006.01)
*H04N 7/173* (2006.01)

(52) U.S. Cl. .................. 709/250; 370/464; 386/126; 725/87

(58) Field of Classification Search ............... None
See application file for complete search history.

(56) References Cited

U.S. PATENT DOCUMENTS

| 6,944,185 B2 * | 9/2005 | Patki et al. | 370/474 |
| 2005/0053090 A1 * | 3/2005 | Harada et al. | 370/464 |
| 2008/0008456 A1 * | 1/2008 | Buttars et al. | 386/125 |
| 2009/0034939 A1 * | 2/2009 | Okada et al. | 386/126 |

FOREIGN PATENT DOCUMENTS

| CA | 2301935 | 9/2000 |
| JP | 2005-073239 | 3/2005 |
| KR | 2005-0016194 | 2/2005 |
| KR | 10-2005-0052927 | 6/2005 |

* cited by examiner

*Primary Examiner*—Wen-Tai Lin
(74) *Attorney, Agent, or Firm*—McKenna Long & Aldridge LLP

(57) ABSTRACT

An apparatus for playing media and method of setting resources thereof are disclosed, by which an application is able to substantially control a media player in a manner that a specific resource used for a media player is set to be allocated by the application. The present invention includes creating a player controlling media signals, setting at least one specific resources to be used by the created player, and executing the created player using the set specific resource.

10 Claims, 6 Drawing Sheets

FIG. 3

```
public interface PlayerResourceHandler {
        public void setPlayerResources(org.davic.resources.ResourceProxy[] proxys)
            throws java.lang.IllegalArgumentException;

public org.davic.resources.ResourceProxy[] getPlayerResources();
}
```

# APPARATUS FOR PLAYING MEDIA AND METHOD OF SETTING RESOURCES THEREOF

This application claims the benefit of the Korean Patent Application No. 10-2006-0013642, filed on Feb. 13, 2006, which is hereby incorporated by reference as if fully set forth herein.

BACKGROUND OF THE INVENTION

1. Field of the Invention

The present invention relates to an apparatus for playing media and method of setting resources thereof. Although the present invention is suitable for a wide scope of applications, it is particularly suitable for enabling an application to set a JMF (Java Media Framework) player to use specific resources.

2. Discussion of the Related Art

Generally, the rapid development of digital broadcasting enables digital broadcasts of high image and sound quality via various broadcast media including terrestrial broadcasting, satellite broadcasting, cable broadcasting and the like. And, the broadcasting stations and cable broadcast providers introduce data broadcast services capable of providing various kinds of additional information together with broadcast programs.

Data broadcasting includes an end-to-end interactive personalized solution that provides Internet, e-commerce services and the like, living information such as broadcast program associated information, weather forecast, news, traffic information and the like, and the conventional broadcast programs.

A broadcasting station provides broadcast programs and ancillary data contents and a data broadcast receiver provided with an access card enables Internet communications. So, users can be sufficiently provided with specific information. For instance, a user is able to check characters, historical backgrounds and the like by accessing Internet while viewing a historical program. And, a user is able to check personal history of singers or athletes while viewing an amusement or sports program.

Owing to the data broadcasting characteristics enabling the bi-directional communications, the data broadcasting is applicable to various fields including entertainments, shopping, sports, educations, and the like. So, it is expected that the data broadcast services will be more aggressively popular. So, many efforts have been made to research and develop data broadcast receivers capable of data broadcast processing functions.

A data broadcast receiver employs Java media framework (hereinafter abbreviated JMF) to control media input signals. In the JMF, an object called a player substantially controls media signals. In particular, specific resources are automatically allocated to the player to control media signals.

However, if a player-specific resource fails to be allocated to a player, the player is unable to directly control media signals. So, in a system provided with multi-resources, an application passively operates a system in using system resources to put limitation on providing services.

SUMMARY OF THE INVENTION

Accordingly, the present invention is directed to an apparatus for playing media and method of setting resources thereof that substantially obviate one or more problems due to limitations and disadvantages of the related art.

An object of the present invention is to provide an apparatus for playing media and method of setting resources thereof, by which an application is able to substantially control a media player in a manner that a specific resource used for a media player is set to be allocated by the application.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of setting resources in a media player according to the present invention includes the steps of creating a player controlling media signals, setting at least one specific resources to be used by the created player, and executing the created player using the set specific resource.

In another aspect of the present invention, an apparatus for playing media includes at least one tuner unit receiving broadcast signals, at least one video plane processing the received broadcast signals, and an application control unit designating a specific one of the at least one tuner unit and/or a specific one of the at least one video plane to use in controlling media signals, the application control unit controlling the media signals using the designated specific tuner unit and/or the designated specific video plane.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is an exemplary diagram of a resource handling interface;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
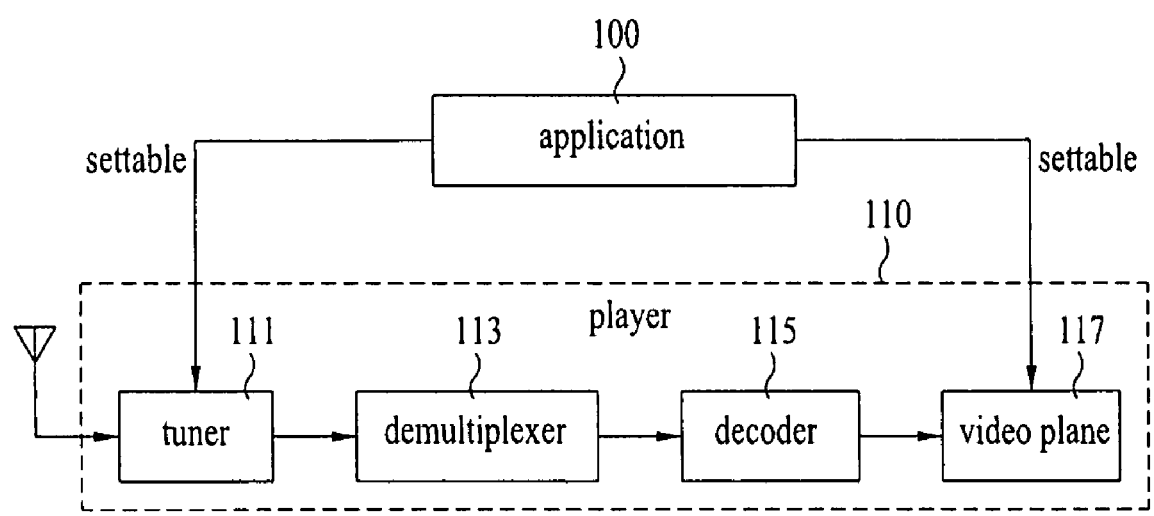
FIG. 1 is a block diagram of a player to explain an operation of allocating a resource to the player to control media signals according to the present invention.

FIG. 1 is a block diagram of a player to explain an operation of allocating a resource to the player to control media signals according to the present invention.

Referring to FIG. 1, in order to control a media signal, a player 110 uses resources including a tuner 111, a demultiplexer 113, a decoder 115, a video plane 117, and the like. The player 110 is created by an application 100. And, a resource the player 110 attempts to use is reserved and allocated by the application 100 or the player 110.

In the related art, a specific resource is automatically allocated to the player 110 by a system to control media signals. In particular, the application 100 creating the player 110 is unable to designate an allocation of a specific one of a plurality of resources required for the player 110 to control the media signals. So, the application 100 is unable to have the specific resource designated and allocated to use.

The use of the tuner 113 and the video plane 117 among the resources used by the player 110 is defined in the specifications as follows. First of all, the related art player is unable to control media signals using a specific one of a plurality of tuners and a specific one of video planes. In particular, the player uses a resource, which is not currently used by another player, among a plurality of resources according to allocation or a resource allocated according to a priority of the corresponding player.

As mentioned in the foregoing description, if a resource to be used to control media signals is passively allocated to the player 110 created by the application 100, it is unable to utilize the resource effectively even if there exist a plurality of resources usable by the player 110.

Figure 2:
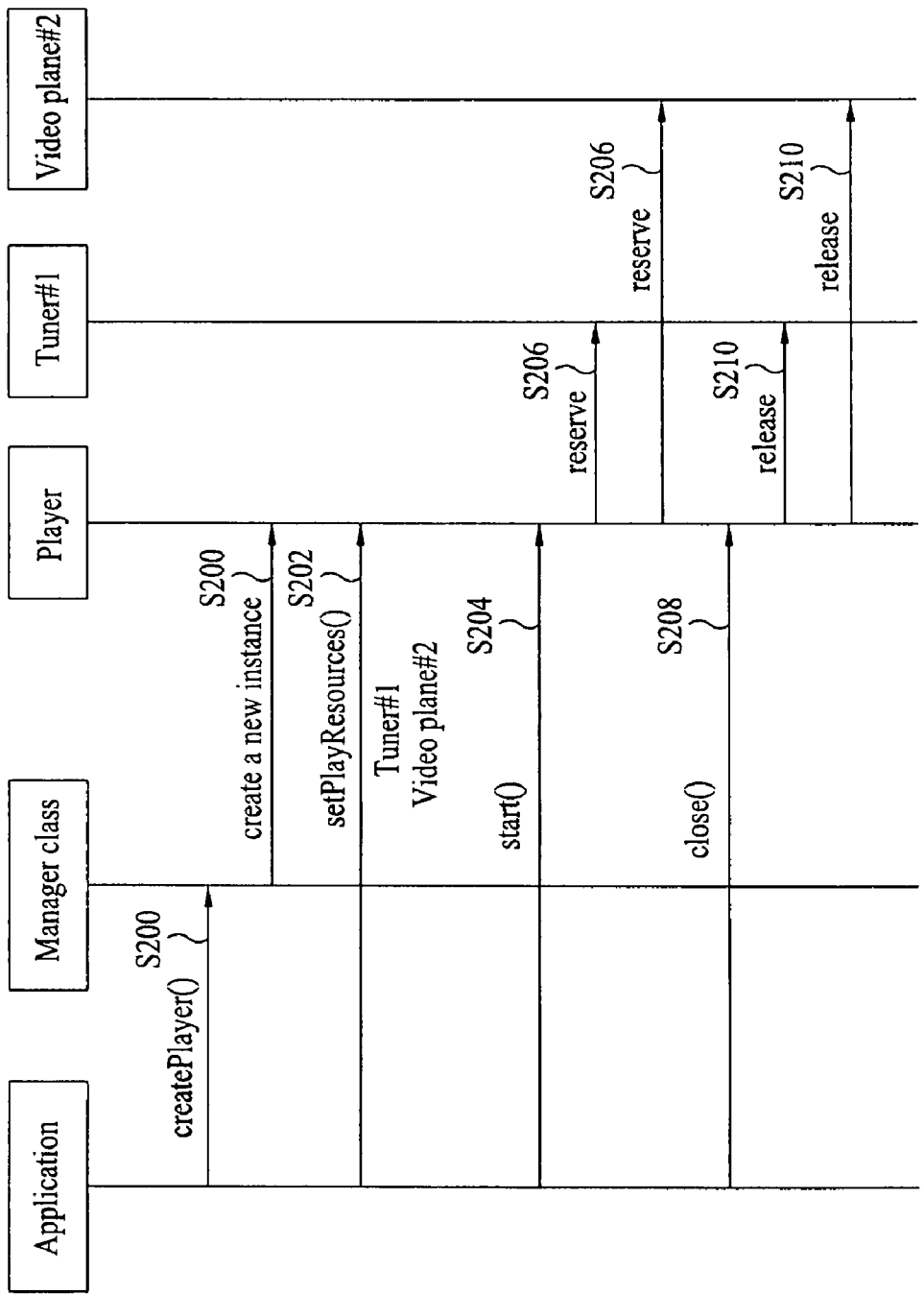
FIG. 2 is a flowchart of a method of setting resources of a media player according to a first embodiment of the present invention.

FIG. 2 is a flowchart of a method of setting resources of a media player according to a first embodiment of the present invention.

Referring to FIG. 2, a player to control media signals is created in a step S200. In particular, an application executed to provide a specific service creates the player controlling the media signals using a player creating method creatPlayer( ) included in a manager class. By the player creating method, a sort of tool to create the player is configured. Subsequently, the manager class generates an instance for the player and reserves a heap memory to store an object, e.g., variables, a class, etc. to enable the player to operate substantially.

In a step S202, the player is made to implement a resource handling interface. So, the player is set to be capable of using a specific resource. The application sets the player to control the media signals using specific resources, e.g., a first tuner and a second video plane. Besides, details of the step S202 will be explained with reference to FIG. 3 as follows.

FIG. 3 is an exemplary diagram of a resource handling interface.

Referring to FIG. 3, a resource handling interface PlayerResourceHandler includes a resource setting method setPlayerResources( ) that implements an interface containing proxy information for a specific resource.

In the specifications, it is defined that an interface containing proxy information for a resource (org.davic.respources.ResourceProxy) is implemented for resources that can be allocated by an application.

The meaning of 'implementation' is that an interface is extended. In the implementation of the interface containing the proxy information for resources, although the interface containing the proxy information for resources is extended, proxy information for a specific resource is inputted to use.

Meanwhile, there can exist a plurality of resources allocated to a player to use. So, the proxy information for a specific resource contained in an interface is implemented in a format of array org.davic.resources.ResourceProxy[ ] proxy. For instance, it may happen that a player is made to use a specific one of a plurality of tuners and a specific one of a plurality of video planes to control media signals. Namely, it may happen that a player is made to use a plurality of resources allocated to the corresponding player. By considering this, proxy information for a specific resource contained in an interface is implemented in a format of array.

Thus, a tuner among resources used for a player to control media signals is defined as a class called a network interface org.davic.net.tuning.NetworkInterface in the specification. An object of the network interface class is a network interface for a tuner. The network interface is controller by an object of a network interface controller (org.davic.net.tuning.NetworkInterfaceController) class created by an application.

The network interface controller class implements an interface containing proxy information for resources. Thus, as proxy information for a specific tuner is included in a resource handling interface, a network interface for the specific tuner can be controlled.

Meanwhile, in the specification, a video plane among resources used for a player to control media signals is defined as a specific class org.havi.ui.HVideoDevice. So, the video plane eventually implements an interface containing information for a resource.

Like the case of the tuner, in case of a video plane, proxy information for a specific video plane is contained in a resource handling interface to control an interface for the specific video plane.

In particular, in case of using a resource setting method that implements an interface containing proxy information for a specific resource, an interface for the specific resource is controller. Namely, since a specific resource to be used by a player is set, the player is able to control media signals using the specific resource set by an application.

A resource handling interface contains an exceptional situation handling class java.lang.IllegalArgumentException to cope with an erroneous situation occurring on a system. In particular, a situation that a method is wrong, a situation that an incorrect factor is delivered, or the like can be handled.

A resource handling interface contains a resource notifying method getPlayerResources( ) to notify proxy information for a specific resource.

As a resource setting method is contained in a resource handling interface, it is able to ser a resource used for a player to control media signals. Yet, in case that a plurality of players are operating, collision in having the same source set by the players should be avoided. Since a resource notifying method is contained in a resource handling interface, a player notifies resources to use in controlling media signals to an application. Hence, the application can be prevented from setting the same resource to be used by the player.

In a step S204, the application executes the player. In particular, the application executes the player using an execution method Start( ). Yet, the resource set by the application is not allocated to the execution method.

In a step S206, the executed player reserves a resource to use. The player reserves the first tuner and the second video plane as the resources used to control media signals. In having the resources reserved by the player, the same resources set by the resource setting method in the step S202 are reserved. And, the executed player controls the media signals using the first tuner and the second video plane.

In a step S208, an operation of the player is terminated. In particular, the application terminates the operation of the executed player to control current media signals using a close method Close( ).

In a step S210, the resources having been used by the executed player are released. In case that the operation of the player is closed, the first tuner and the second video plane having been used for the execution of the player are released. So, another player is able to control media signals using the released first tuner and the released second video plane.

Figure 4:
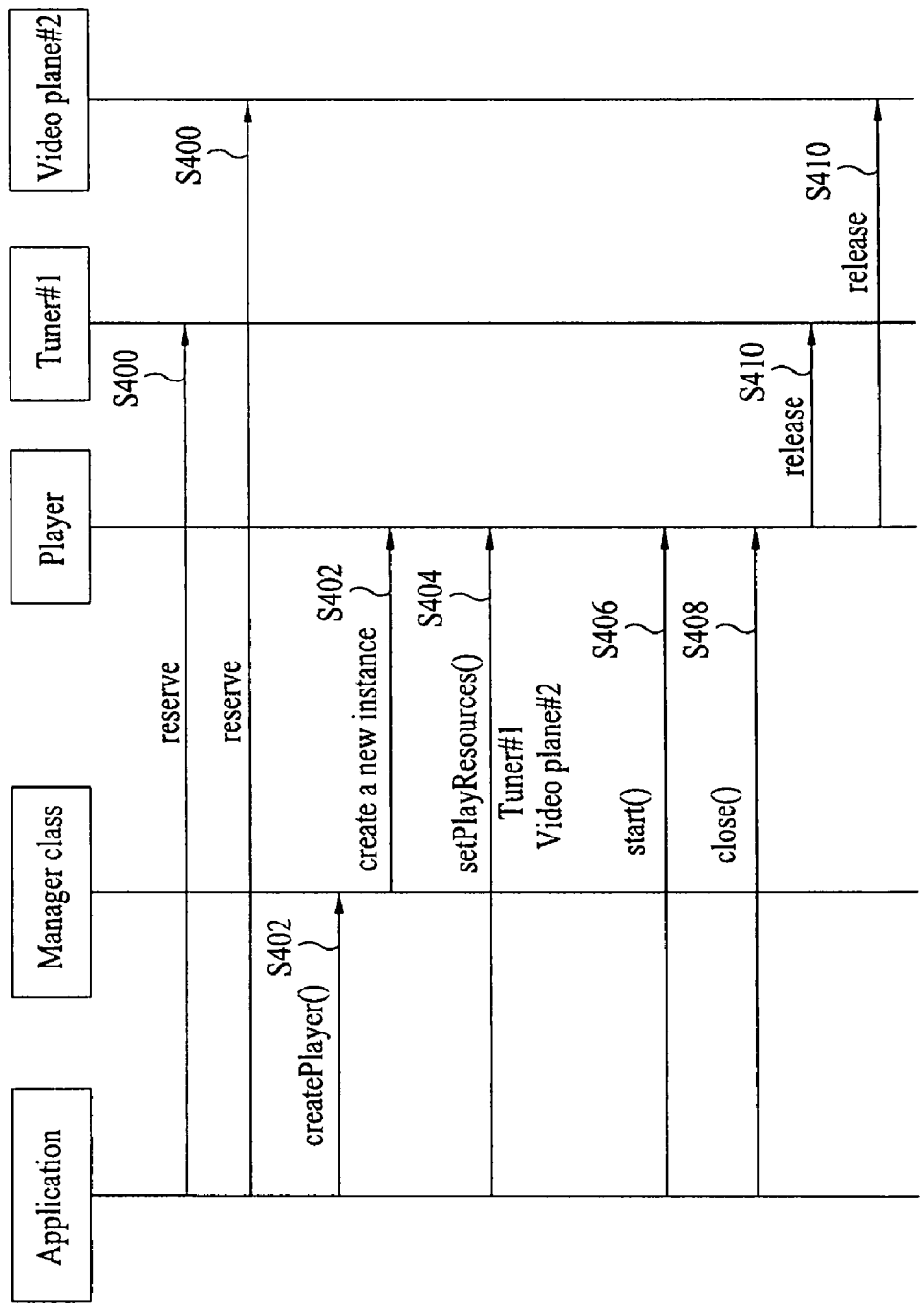
FIG. 4 is a flowchart of a method of setting resources of a media player according to a second embodiment of the present invention.

FIG. 4 is a flowchart of a method of setting resources of a media player according to a second embodiment of the present invention.

Referring to FIG. 4, in a step S400, an application reserves all specific resource required for implementing a player. In particular, the application reserves all resources required for providing a specific service to control media signals, e.g., a first tuner and a second video plane among a plurality of tuners and video planes. Yet, it is not mandatory that the player should use the reserved first tuner and the reserved second video plane in controlling the media signals only. This is because the reserved resources may be allocated to another player to use if a priority of the former player having reserved the first tuner and the second video plane may be lower than that of the latter player.

In a step S402, the application creates a player to control media signals using the reserved resources. In doing so, the application creates the player to control media signals using a player creating method and a manager class creates an instance for the player.

In a step S404, the player enables a resource handling interface to be implemented so that the player is set to use specific resources. In this case, the resource handling interface contains a resource setting method for implementing an interface containing proxy information for the specific resources.

Yet, the proxy information for the specific resources becomes the proxy information for the specific resources having been reserved by the application in the step S400. Namely, since the application has reserved the first tuner and the second video plane to be used by the player in controlling the media signals in the step S400, the resource handling interface includes the method for implementing the interface containing the proxy information for the first tuner and the second video plane.

In a step S406, the player is executed. In particular, the application executes the player using an execution method. Subsequently, the first tuner and the second video plane set in the step S404 are allocated to the player. The player then uses the allocated tuner and video plane in controlling the media signals.

In a step S408, an operation of the player is terminated. In particular, the application terminates the operation of the executed player to control current media signals using a close method Close( ).

In a step S410, the resources having been used by the executed player are released. In case that the operation of the player is closed, the resources having been used for the execution of the player are released. So, another player is able to control media signals using the released resources.

Figure 5:
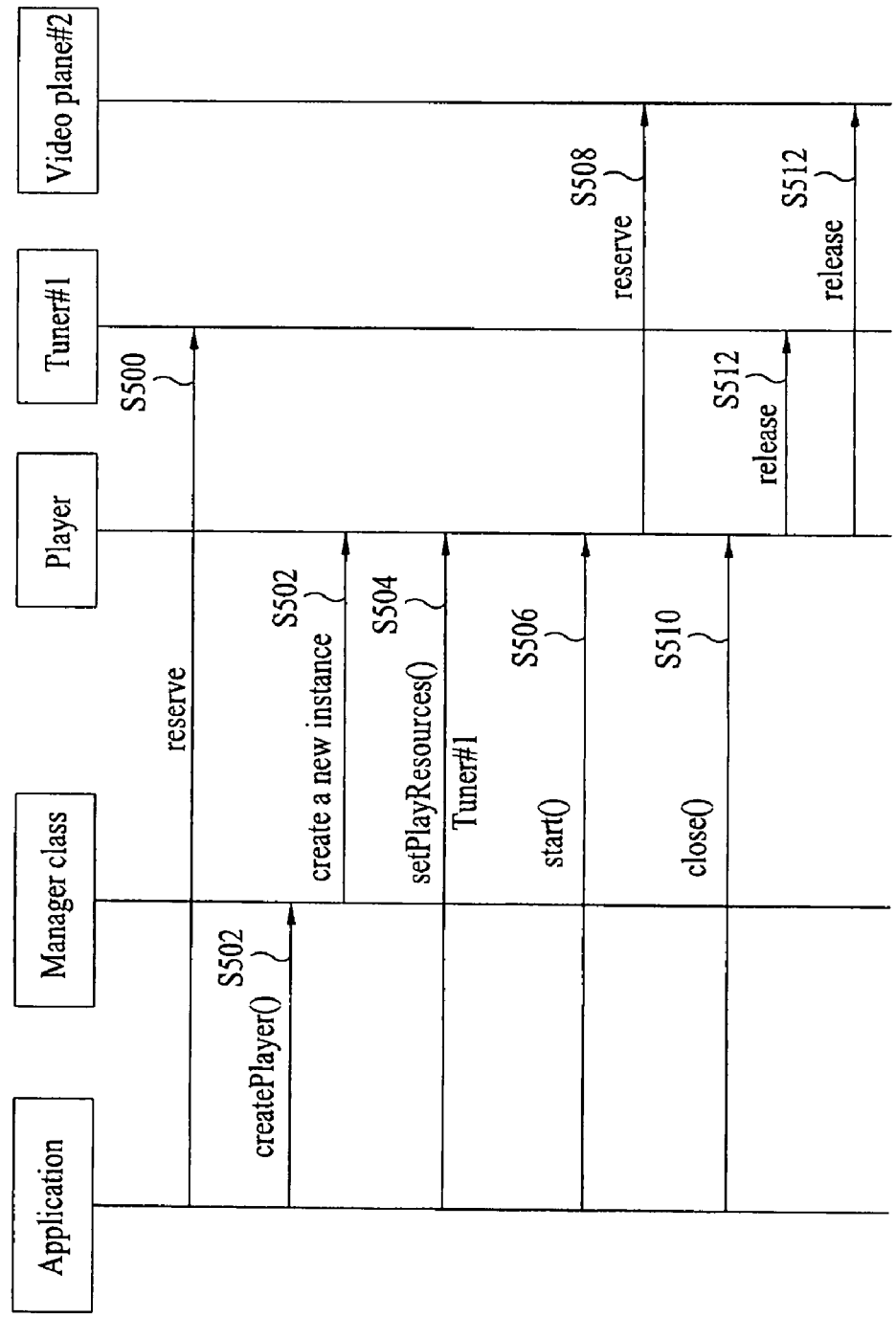
FIG. 5 is a flowchart of a method of setting resources of a media player according to a third embodiment of the present invention.

FIG. 5 is a flowchart of a method of setting resources of a media player according to a third embodiment of the present invention.

Referring to FIG. 5, in a step S500, at least one of all resources required for providing a specific service is reserved in part. For instance, although specific resources required for an application to provide a specific service called a media signal control are a tuner and a video plane, the application reserves the first tuner only as a specific resource. Namely, although the video plane is needed as a specific resource to provide the specific service, the application does not reserve the video plane specifically. Yet, it is not mandatory that the reserved resource should be used for the application to provide the specific service.

In a step S502, a player is created to control media signals using the reserved resource and a resource required for providing the specific service. In particular, the application creates the player to control media signals using a player creating method and a manager class creates an instance for the player.

In a step S504, the player is set to control the media signals using the specific resource by enabling the player to implement a resource handling interface. In this case, the resource handling interface includes a resource setting method implementing an interface containing proxy information for the specific resource. In particular, the proxy information for the specific resource is the proxy information for the first tuner as the specific resource having been reserved by the application in the step S500.

In a step S506, the player is executed. In particular, the application executes the player using an execution method.

In a step S508, an unreserved resource among resources used by the executed player is reserved. In particular, the resources required for the player to control media signals are a tuner and a video plane. Yet, in case of the tuner, the application has already reserved the first tuner in the step S500. So, the player just reserves the second video plane only among the video planes corresponding to the unreserved resources used to control the media signals.

After completion of the reservation for the specific video plane, the player is provided with the first tuner allocated in the step S504 and then uses the first tuner in controlling the media signals. Yet, since the video plane was not set by the application in the step S504, the video plane used by the player to control the media signals may be the reserved second video plane or may not. In particular, in case that the second video plane reserved by the player is currently used by another player, it is impossible for the former player to use the second video plane despite the reservation of the second video plane.

In a step S510, an operation of the player is terminated. In particular, the application terminates the operation of the executed player to control current media signals using a close method.

In a step S512, the resources having been used by the executed player are released. In case that the operation of the player is closed, the resources having been used for the execution of the player are released. So, another player is able to control media signals using the released resources.

Figure 6:
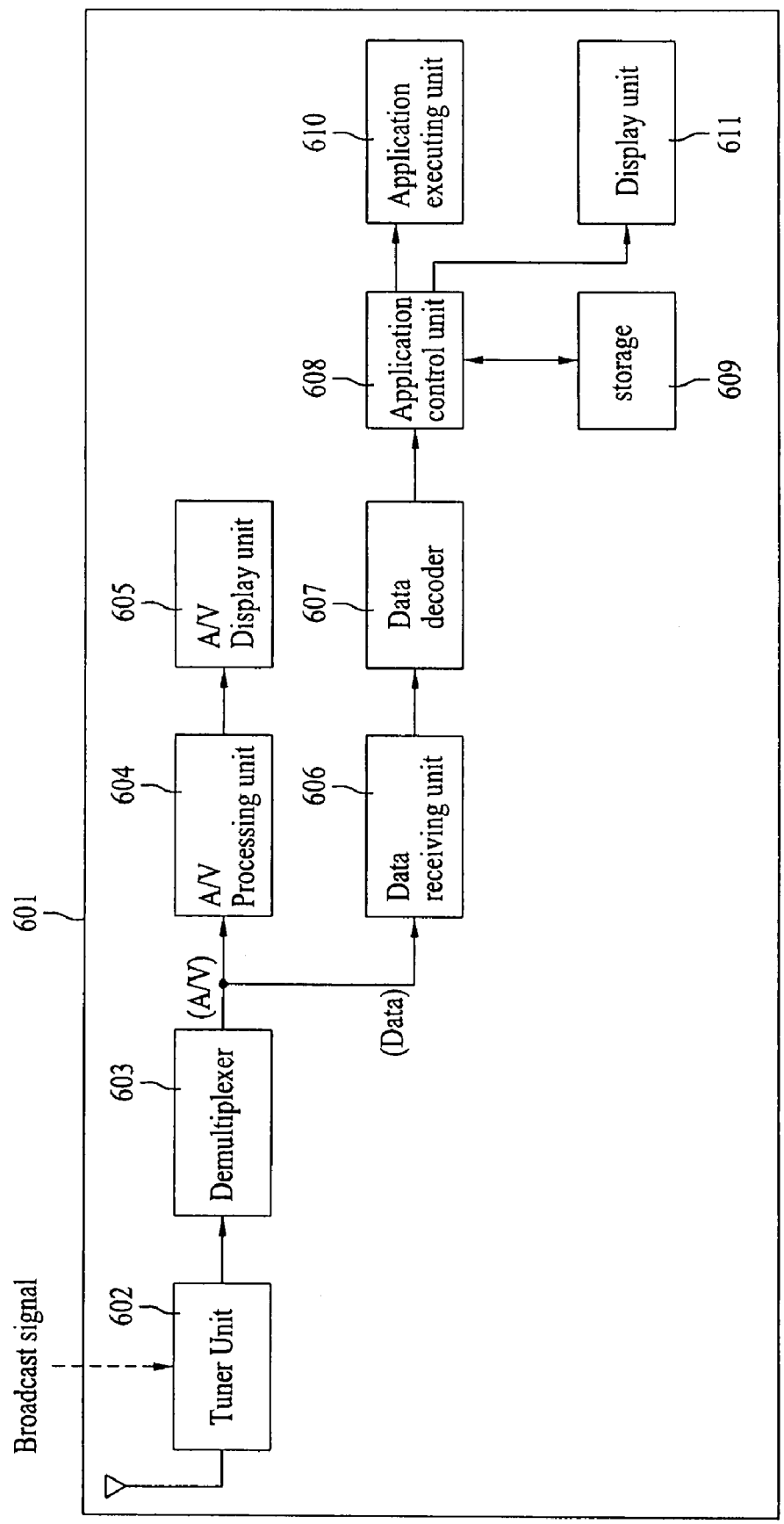
FIG. 6 is a block diagram of an apparatus for playing media according to the present invention.

FIG. 6 is a block diagram of an apparatus for playing media according to the present invention.

Referring to FIG. 6, an apparatus 601 for playing media according to the present invention includes at least one tuner unit receiving broadcast signals, at least one video plane processing the received broadcast signals, and an application control unit designating a specific one of the at least one tuner unit and/or a specific one of the at least one video plane to use in controlling media signals, the application control unit controlling the media signals using the designated specific tuner unit and/or the designated specific video plane.

In particular, the apparatus 601 includes a tuner unit 602, a demultiplexing unit 603, an A/V processing unit 604, an A/V display unit 605, a data receiving unit 606, a data decoder 607, an application control unit 608, a storage unit 609, an application executing unit 610, a display unit 611, and the like.

The broadcast receiver 601 includes a digital television (DTV) capable of receiving data broadcasts or the like.

The tuner unit 602 receives broadcast signals from a broadcasting station. For instance, the tuner unit 602 receives cable broadcast signals or the like from a cable system operator (SO) or a multiple system operator (MSO).

The demultiplexing unit 603 separates A/V broadcast signals and data broadcast signals from the received broadcast signals. The demultiplexing unit 603 transfers the A/V broadcast signals to the A/V processing unit 604 and the data broadcast signals to the data receiving unit 606.

The A/V processing unit 604 carries out a decoding process and the like to enable the received A/V broadcast signals to be outputted via the A/V display unit 605.

The A/V display unit 605 outputs the decoded A/V broadcast signals or the like. In this case, the A/V display unit 605 includes speakers, a display of the broadcast receiver, and the like.

In the present specification, the A/V processing unit 604 and the A/V display unit 605 configure a video plane.

The data receiving unit 606 performs processes of header removal and the like on the data broadcast signals received from the demultiplexing unit 603 and then transfers the processed signals to the data decoder 607. In this case, the data broadcast signals transferred to the data receiving unit 606 as segmented into a plurality of data. This is because a broadcasting station or the like is unable to transfer a complete file of the signals at one time.

The data decoder 607 decodes the data broadcast signals received from the data receiving unit 606 and then converts a plurality of the segmented data to one complete file.

The application control unit 608 controls the storage unit 609, the application executing unit 610, the display unit 611, and the like to enable the data broadcast signals received from the data decoder 607 to be stored in the storage unit 609.

According to the present invention, the application control unit 608 controls an application to directly designate resources to use.

In the related art, an application is just responsible for a creation of a player controlling media signals and resources used by the player are automatically allocated.

Yet, in the present invention, the application creates a player and designates resources to be used by the player. The application control unit 608 sets specific resources by implementing a resource handling interface. Details of the specific resource setup have been explained in the foregoing description, thereby omitted in the following description.

The application executing unit 610 plays a role in executing various applications under the control of the application control unit 608. In this case, the applications include data broadcasts associated games, advertisements, ordering pictures, etc.

The display unit 611 plays a role in displaying various kinds of information necessary for users under the control of the application control unit 608.

And, the storage unit 609 stores various applications therein under the control of the application control unit 608. In this case, the storage unit 609 includes a flash memory, a semi-perpetual memory, a non-volatile memory, and the like except a volatile or temporary memory.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of setting a Java Media Frame Player, the method comprising the following computer-implemented steps of:
    creating, by an application in a device, the Java Media Frame Player playing media including audio and/or video;
    setting, by the application, resources to be used by the created Java Media Frame Player; and
    executing the created Java Media Frame Player using a specific resource,
    wherein the Java Media Frame Player implements a resource handling interface, the resource handling interface defining the resources capable of being set by the application as proxy information, and
    wherein the Java Media Frame Player plays the media by selecting the specific resource of the resources.

2. The method of claim 1, wherein the resources are reserved by the application.

3. The method of claim 1, wherein the resources are reserved by the Java Media Frame Player.

4. The method of claim 1, wherein at least one of the resources is reserved by the application and at least one of the resources is reserved by the Java Media Frame Player.

5. The method of claim 1, wherein the resources are set by defining proxy information of an array format in the resource handling interface through which the application interfaces with a manager class.

6. An apparatus for setting a Java Media Frame Player, the apparatus comprising:
    a plurality of resources including at least one tuner unit receiving broadcast signals and at least one video plane processing the received broadcast signals; and
    an application control unit implementing an application,
    wherein the application creates the Java Media Frame Player playing media including audio and/or video in the apparatus, sets resources to be used by the created Java Media Frame Player and executes the created Java Media Frame Player using a specific resource, and
    wherein the Java Media Frame Player implements a resource handling interface, the resource handling interface defining the resources capable of being set by the application as proxy information, and
    wherein the Java Media Frame Player plays the media by selecting the specific resource of the resources.

7. The apparatus of claim 6, wherein the resources are reserved by the application.

8. The apparatus of claim 6, wherein the resources are reserved by the Java Media Frame Player.

9. The apparatus of claim 6, wherein the resources are set by defining proxy information of an array format in the resource handling interface through which the application interfaces with a manager class.

10. The apparatus of claim 6, wherein at least one of the resources is reserved by the application and at least one of the resources is reserved by the Java Media Frame Player.

* * * * *